Patented May 30, 1933

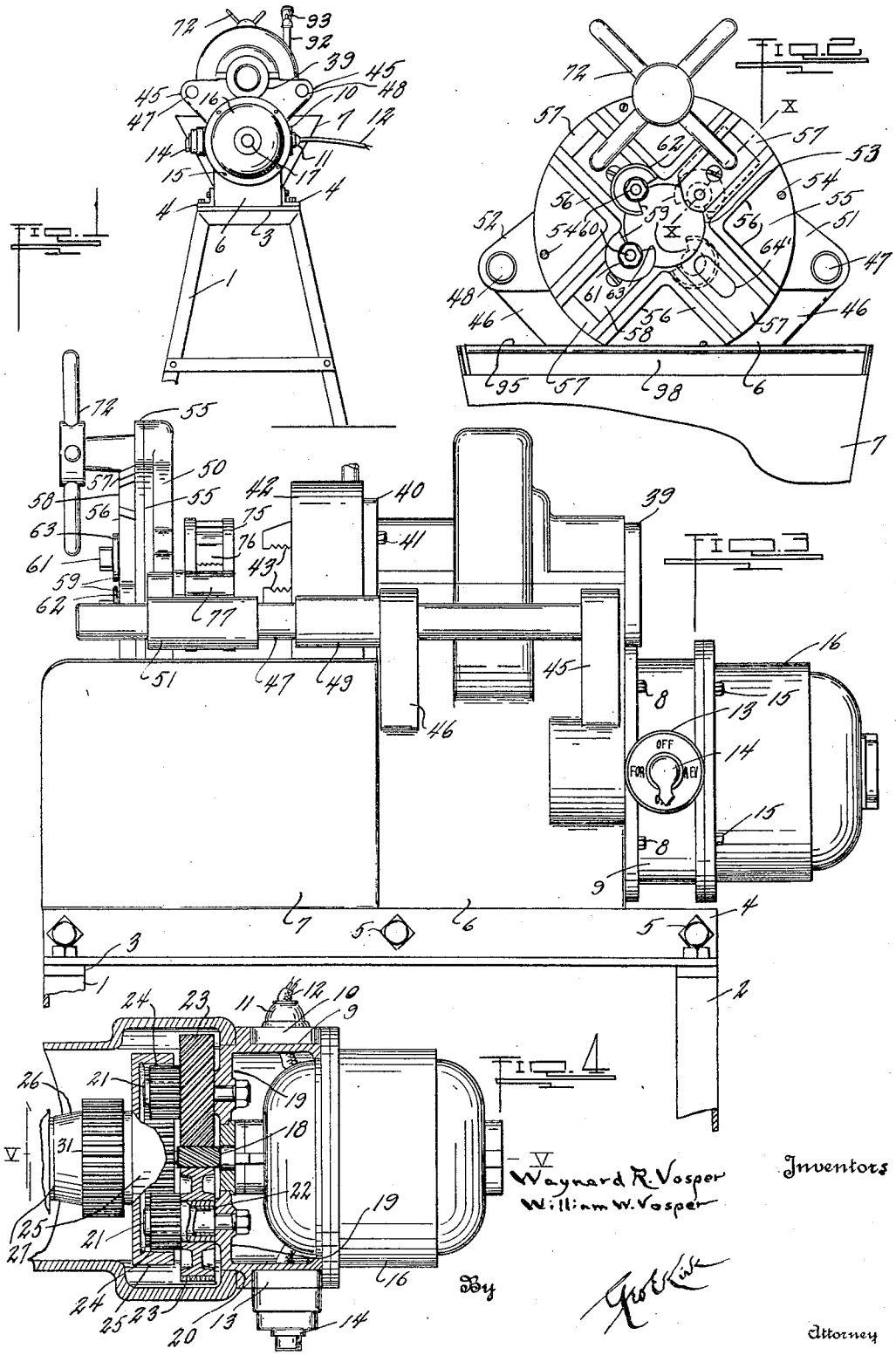

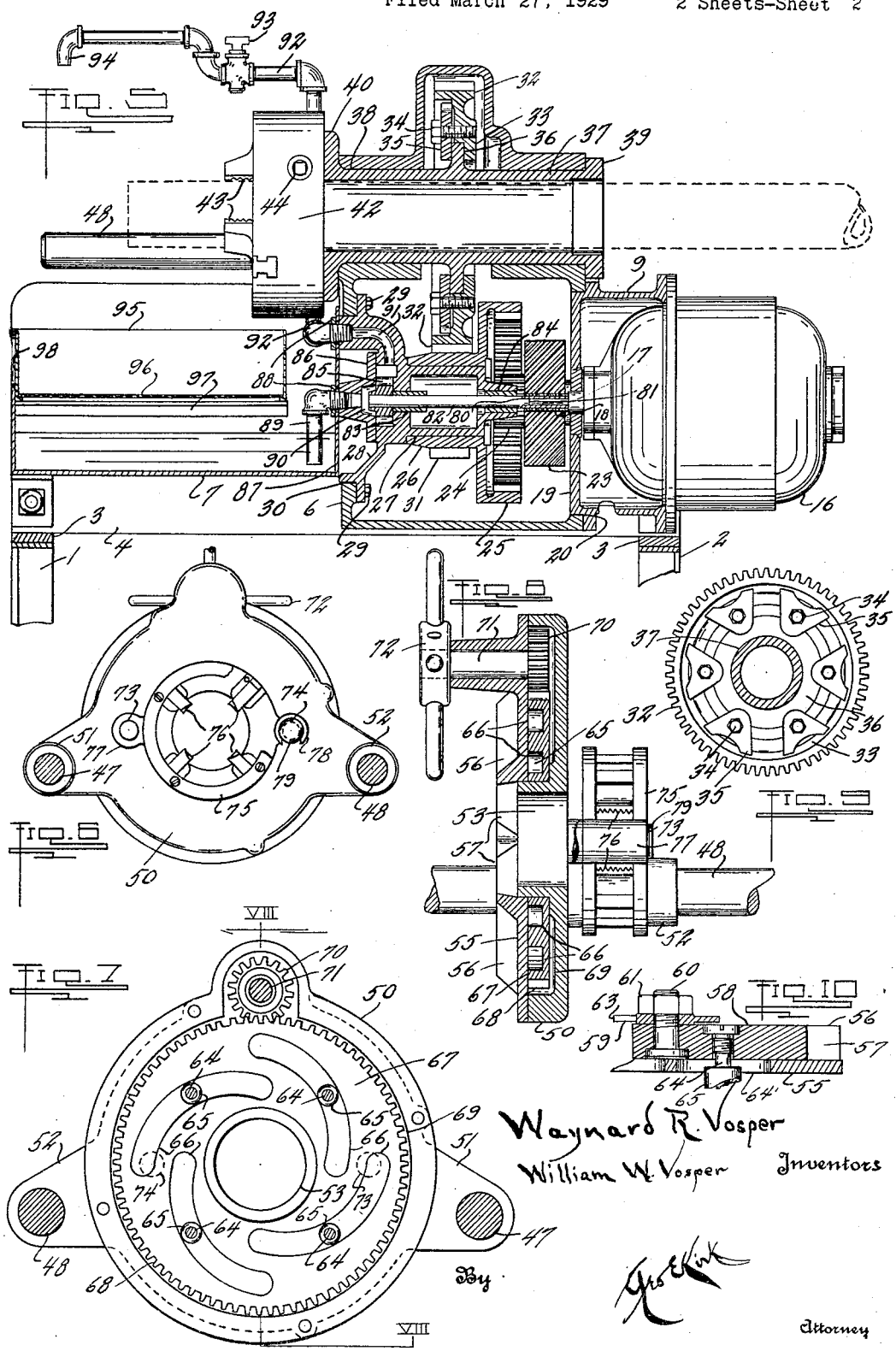

1,912,050

UNITED STATES PATENT OFFICE

WAYNARD R. VOSPER AND WILLIAM W. VOSPER, OF TOLEDO, OHIO, ASSIGNORS TO THE TOLEDO PIPE THREADING MACHINE CO., OF TOLEDO, OHIO, A CORPORATION OF OHIO

PIPE TOOL

Application filed March 27, 1929. Serial No. 350,249.

This invention relates to power actuation between dies and work.

This invention has utility when incorporated in readily portable pipe cutting and threading equipment, with the dies manually set as to the rotating work.

Referring to the drawings:

Fig. 1 is an elevation from the power end of an embodiment of the invention in a pipe cutter and threading tool;

Fig. 2 is a view of the apparatus of Fig. 1, from the opposite or die located end, parts being broken away;

Fig. 3 is a side elevation;

Fig. 4 is a fragmentary plan view of the transmission from the motor drive for rotating the hollow spindle carrying the work;

Fig. 5 is a fragmentary vertical section on the line V—V, Fig. 4;

Fig. 6 is a detail view looking into the yoke on the side thereof carrying the thread cutting dies;

Fig. 7 is a view of the yoke with the die plate removed to show the die shifting mechanism from the cutting die side;

Fig. 8 is a section on the line VIII—VIII, Fig. 7;

Fig. 9 is a fragmentary view showing features of the slippage connection in the spindle drive for the work; and Fig. 10 is a view on the line X—X, Fig. 2.

Angle legs 1, 2, are assembled with end cross plates 3 (Figs. 1, 3, 5) carrying angle irons 4 thereby providing a table on which is mounted by bolts 5 main frame 6 and pan extension 7 therefrom. By bolts 8 there is assembled ring section 9 having socket 10 for plug terminal 11 of electric current supply lines 12. This ring 9 is also provided with insulation block 13 and switch 14. Mounted with the ring 9 by bolts 15 is reversible universal motor 16 having shaft 17 therefrom extending through the ring 9 and into the main frame 6 terminating in helical tooth pinion terminus 18.

The ring 9 is provided with plate 19 in opening 20 (Figs. 4, 5) of the frame 6. This plate 19 has mounted therein pins 21 carrying bearings 22. These pins 21 are two in number, diametrically opposing the pinion 18 and have mounted thereon helical gears 23 in mesh with the pinion 18. Fast with these gears 23 are pinions 24 coacting with internal gear 25 having lateral sleeve extension 26 on bearing 27 carried by enlargement 28 anchored by bolts 29 in opening 30 aligned with the opening 20 and on the opposite end of the frame 6.

This sleeve 26 has pinion 31 as a tooth portion thereof in mesh with ring gear 32 having flange 33. Bolts 34 through plates 35 engage the flange 33 to effect between said flange 33 and the plate 35 frictional clamping with intermediate flange 36 fast on tubular spindle 37 having bearing 38 in the frame 6, in axial parallelism with the shaft 17. This tubular spindle 37 has terminal flanges 39, 40, holding this spindle against axial shifting in the two part bearing provided by the frame 6. Adjacent the flange 40 and remote from the bearing 16 there is mounted by bolts 41 chuck 42 having jaws 43 adjustable by rotating stems 44. The rod, bar or pipe is accordingly concentrically anchored by the chuck 42 as to the tubular sleeve or spindle 37 and positively rotated upon operation of the motor 16 in either a right hand or left hand direction. In the event there is excess of resistance at any time on the work, the adjusted clamping of the bolts 34 allow for slippage between the ring gear 32 and the spider 37, thereby taking up any serious shock from the transmission or motor.

The main frame 6 is provided with upwardly extending ears 45, 46, as aligning eyes axially parallel with the spindle 37 and on opposite sides thereof, slightly below the axial line to carry guides 47, 48. On the guide rod 47, adjacent the ear 46, is loose stop or sleeve 49.

A yoke is provided herein, shown as comprising a main disk member 50 having sleeve-providing ears 51, 52, coacting respectively with the guides 47, 48. This yoke device may be readily thrust upon the free outer ends of these guides 47, 48, toward the chuck 42, with central opening 53 of this yoke 50 in axial alignment with the chuck 42 and the spindle 37 (Figs. 6, 7, 8).

In the thrust of this yoke 50 toward the chuck 42, the stop 49 prevents shifting of this yoke or parts carried thereby against the jaws 43. This yoke 50 has anchored thereon by bolts 54, (Fig. 2) plate 55 having four pairs of radially extending overhanging ribs 56 in providing dove-tail guide ways 57 converging toward the opening 53. In each of these ways 57 is block 58 having segmental disk cutter die 59, adjustably anchored therewith on pins 60 by nuts 61. These cutting off tools or dies 59 are in a common plane at a progressive radial distance as to the cutting edge from the axis of the opening 53. Furthermore, these dies 59 as to one diametrical pair are provided with V-cutting edges 62 (Fig. 2) and the intermediate or alternate dies have square nose cutting edges 63. These dies may be reversed on opposite rotation of the work or be removed and bodily reversed for the same direction of work, and thereby provide duplicate cutting edges which may be readily renewed by sharpening.

Each of these blocks 58 is additionally provided with pin 64 extending through slot 64' of the plate 55, and carries a roller 65, each in a 90° scroll or spiral way 66 (Fig. 7) of plate 67 having peripheral tooth portion 68. This disk gear 67, 68, is assembled by the plate 55 in the recess 69 of the yoke 50.

Pinion 70 on stem 71 is in mesh with this tooth portion 68 of the radial shifting means for the cutter dies. This stem 71 as protruding through the plate 55 has thereon hand wheel 72 so that in rotation of such hand wheel clockwise, the dies are retracted simultaneously, while in the rotation of the hand wheel 72 counter-clockwise, the dies are simultaneously caused to travel inward toward the axis of the opening 53 and thereby during the rotation of the work, effect a desired degree of cutting off speed for the pipe, rod or bar. This adjusting is manual and independently of the speed of the work as power actuated.

This yoke 50, upon the side thereof opposite the plate 55 (Fig. 6) is provided with diametrically disposed pins 73, 74. Ring 75 has progressive series of thread cutting dies 76 anchored therein in a common plane. This ring 75 has eye 77 which may readily slip over the pin 73 as a hinge pin permitting swinging of the ring 75 away from alignment with the opening 53 of the yoke 50, during the operation of the cutting off dies.

In the event cutting dies for threading are desired to be used, the cutting off dies may be retracted and the ring 75 swung on the hinge pin 73 to have hook 78 embrace the pin 74 (Figs. 6, 7) back of collar enlargement 79 on this pin 74. At this position, the ring 75 is snugly located against the side of the yoke 50 toward the chuck 43 and with the pipe located beyond the desired extent for threading clear of the chuck 43, the yoke 50 may be pushed along the guides 47, 48, during the rotation of the work by the motor 16, to bring the thread cutting dies in the ring 75 into engagement, and as the cutting dies engage in the work, the progress of the ring 75 in the thread cutting toward the chuck 43 is automatic. As the desired extent of cutting under the speed reduction driving of the transmission from the motor 16 is effected, the motor 16 may be reversed and the ring 75 automatically backed off away from the work. The ring is held from rotation by the yoke 50 as slidable on the guides 47, 48.

The balanced location of the motor 16 with the drive therefrom is a compact substantial speed reduction from the small pinion and permits, in a compact transmission from the high speed of the motor, a practical threading speed and cutting off speed for pipes and other items of work. After a cutting off and threading have occurred, the work may be reset for a repetition of such sequence of operations or either one thereof as desired.

In the cutting off operations as well as the threading operations, the provision of temperature dissipating means as a fluid is important. This provision is simply cared for in the disclosure herein. The shaft 17 of the motor at the free end of the pinion portion 18 is provided with transverse notch 80 (Fig. 5) with which engages flat end 81 of shaft 82 in bearings 83, 84, within the large bearing 27 for the pinion 26, 31. This shaft 82 beyond the bearing 83 carries gear type impeller 85 fast thereon. This assembly of the shaft 82 and impeller 85 with the enlargement 28 is brought about by block 86 placed at register position by pan end 87 assembled with the housing 6 by fittings and nuts 88.

This pan end 87 and block 86 have therethrough intake duct 89 registering with chamber 90 from which the impeller 85 creates its suction for throwing of the temperature dissipating solution or oil through way 91 into duct 92 having valve 93 and terminal spout 94, which may be swung to be in a desired position over the cutting operation, either at the cutting off dies side of the yoke 50 or the ring thread cutting side of such yoke 50.

This cutting oil or temperature dissipating solution, together with the turnings of the work, fall into pan 95 therebelow having perforate bottom 96 over reservoir 7 of the pan having the end 87. The pan 95, 96, rests upon flanges 97, in thus providing the clearance from the bottom of the reservoir 7. In this position and as retained by end wall 98 of the pan 7, this cuttings-receiving pan 95, 96, is in position to prevent slipping of the yoke 50 off the guides 47, 48. However, if it is desired to remove the yoke, it is only necessary to tilt the pan 95, 96, out of the structure for emptying the turnings, and then the yoke may be removed and a hand threading tool or hand cutting tool may be held in position for the work with the power drive for the work, or there may be substitution of a different yoke and cutting dies.

In practice, the yoke range as for cutting adjustment is sufficient to take care of sizes down from the tubular spindle. Inasmuch as the threading dies are for a particular size as carried, it is only necessary to readily replace one ring 75 with its dies for a different ring. For instance, there may be a ring 75 for two inch pipe, another single ring say with dies for one and one-half inch pipe, etc., or there may be bolt dies instead of pipe dies.

What is claimed and it is desired to secure by United States Letters Patent is:

1. For a tool embodying a rotary work holder, a pair of fixed guides extending parallel to the axis of the holder, a primary ring unit mounted on the guides against lateral shifting and freely movable toward and from the holder, a plurality of tools mounted in the ring, and a control for the tools, the combination of a pair of additional guides on the ring and parallel to the fixed guides, a supplemental ring mounted on the additional guides and provided with mounting means maintaining said supplemental ring for movement at all times in parallelism to and transversely of the plane of the primary ring, and dies mounted in the supplemental ring.

2. For a tool embodying a rotary work holder, a pair of fixed guides extending parallel to the axis of the holder, a primary ring unit mounted on the guides against lateral shifting and freely movable toward and from the holder, a plurality of tools mounted in the ring, and a control for the tools, the combination of a pair of additional guides on the ring and parallel to the fixed guides, a supplemental ring mounted on one of the additional guides as a hinge and swingable toward the axis extended of the holder and at all times in parallelism to the primary ring for hook engagement with the other additional guide, and dies mounted in the supplemental ring.

3. For a tool embodying a rotary work holder, a pair of fixed guide means extending parallel to and below the axis of the holder, a primary ring unit mounted on the guides against lateral shifting and freely movable toward and from the holder, a plurality of cut-off tools mounted in the ring, and a control for the tools, the combination of a pair of additional guides on the ring, a supplemental ring mounted on said additional guides and parallel to the fixed means maintaining said supplemental ring for movement at all times in parallelism to and transversely of the primary ring, and dies fixedly mounted in the supplemental ring.

4. For a tool embodying a rotary work holder, a drive for the holder, a pair of fixed guides extending parallel to the axis of the holder, a primary ring unit mounted on the guides against lateral shifting and freely movable toward and from the holder, a plurality of tools mounted in the ring, and a control for the tools as to which the work may be rotated by the holder, the combination of a pair of additional guides on the ring extending toward the holder, above and parallel to the fixed guides, a supplemental ring mounted on the additional guides and provided with mounting means maintaining said supplemental ring for movement at all times in parallelism to and transversely of the primary ring, and dies mounted in the supplemental ring.

5. For a tool embodying a rotary work holder, a pair of fixed guides extending parallel to the axis of the holder, a primary ring unit mounted on the guides against lateral shifting and freely movable toward and from the holder, a plurality of tools mounted in the ring, and a control for the tools, the combination of a pair of additional guides on the ring and parallel to the fixed guides, a supplemental ring mounted on the additional guides and provided with mounting means maintaining said supplemental ring for movement at all times in parallelism to and transversely of the primary ring, and thread-cutting dies in an annular series fixedly mounted in the ring for coacting during work holder rotation to progress the rings axially of the work along said guides at the cutting rate of the dies along the work.

In witness whereof we affix our signatures.
WAYNARD R. VOSPER.
WILLIAM W. VOSPER.